United States Patent
Shin et al.

(10) Patent No.: US 12,126,072 B2
(45) Date of Patent: Oct. 22, 2024

(54) ANTENNA STACK STRUCTURE AND DISPLAY DEVICE INCLUDING THE SAME

(71) Applicant: DONGWOO FINE-CHEM CO., LTD., Jeollabuk-do (KR)

(72) Inventors: Seung Hyun Shin, Seoul (KR); Yun Seok Oh, Gyeonggi-do (KR); Won Hee Lee, Incheon (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 141 days.

(21) Appl. No.: 17/954,811

(22) Filed: Sep. 28, 2022

(65) Prior Publication Data
US 2023/0032455 A1 Feb. 2, 2023

Related U.S. Application Data

(63) Continuation of application No. PCT/KR2021/003828, filed on Mar. 29, 2021.

(30) Foreign Application Priority Data

Mar. 31, 2020 (KR) .................. 10-2020-0038807

(51) Int. Cl.
*H01Q 1/22* (2006.01)
*H01Q 1/24* (2006.01)
(Continued)

(52) U.S. Cl.
CPC ......... *H01Q 1/2283* (2013.01); *H01Q 1/2266* (2013.01); *H01Q 1/243* (2013.01);
(Continued)

(58) Field of Classification Search
CPC .... H01Q 1/2283; H01Q 1/2266; H01Q 1/243; H01Q 1/38; H01Q 1/48; H01Q 1/1271;
(Continued)

(56) References Cited

U.S. PATENT DOCUMENTS 11,018,420 B2 * 5/2021 Maruyama .......... G02F 1/13338
11,374,317 B2 * 6/2022 Kao ......................... H03H 7/38
2019/0252771 A1 8/2019 Yong et al.

FOREIGN PATENT DOCUMENTS

JP 2017-123586 A 7/2017
KR 10-2004-0047257 A 6/2004
(Continued)

OTHER PUBLICATIONS

Engish translation of KR 101134980 (Year: 2011).*
(Continued)

*Primary Examiner* — Seung H Lee
(74) *Attorney, Agent, or Firm* — The PL Law Group, PLLC (57) ABSTRACT

An antenna stack structure according to an embodiment includes a lower dielectric layer, an antenna electrode layer formed on the lower dielectric layer, and an upper dielectric layer disposed on the antenna electrode layer. A dielectric constant of the upper dielectric layer is 1 or more and less than 7, and a thickness of the upper dielectric layer is in a range from 100 μm to 1,300 μm. A frequency and a band width are finely controlled using the upper dielectric layer while suppressing excessive gain reduction and frequency shift.

13 Claims, 4 Drawing Sheets

(51) Int. Cl.
  *H01Q 1/38* (2006.01)
  *H01Q 1/48* (2006.01)
  *G06F 3/041* (2006.01)
(52) U.S. Cl.
  CPC .................. *H01Q 1/38* (2013.01); *H01Q 1/48* (2013.01); *G06F 3/041* (2013.01)
(58) Field of Classification Search
  CPC ...... H01Q 1/364; H01Q 1/405; H01Q 9/0407; H01Q 1/241; G06F 3/041; G02F 1/1336
  See application file for complete search history.

(56) References Cited

FOREIGN PATENT DOCUMENTS

| KR | 10-1134980 | B1 | 4/2012 | | |
|---|---|---|---|---|---|
| KR | 10-2013-0095451 | A | 8/2013 | | |
| KR | 10-2016-0045649 | A | 4/2016 | | |
| KR | 10-1967771 | B1 | 4/2019 | | |
| KR | 10-2031203 | B1 | 10/2019 | | |
| KR | 10-2020-0010906 | A | 1/2020 | | |
| WO | WO-2020071668 | A1 * | 4/2020 | ............. | G06F 3/041 |

OTHER PUBLICATIONS

English translation of KR 102031203 (Year: 2019).*
International Search Report for PCT/KR2021/003828 mailed on Jul. 22, 2021.
Office action issued on Feb. 15, 2022 from Korean Patent Office in a counterpart Korean Patent Application No. 10-2020-0038807 (all the cited references are listed in this IDS.) (English translation is also submitted herewith.).

* cited by examiner

ANTENNA STACK STRUCTURE AND DISPLAY DEVICE INCLUDING THE SAME

CROSS-REFERENCE TO RELATED APPLICATION AND CLAIM OF PRIORITY

The present application is a continuation application to International Application No. PCT/KR2021/003828, with an International Filing Date of Mar. 29, 2021, which claims priority to Korean Patent Application No. 10-2020-0038807 filed on Mar. 31, 2020 in the Korean Intellectual Property Office (KIPO), the entire disclosures of which are incorporated by reference herein.

BACKGROUND

1. Field

The present invention relates to an antenna stack structure and a display device including the same. More particularly, the present invention relates to an antenna stack structure including an antenna unit and an insulating structure and a display device including the same.

2. Description of the Related Art

As information technologies have been developed, a wireless communication technology such as Wi-Fi, Bluetooth, etc., is combined with a display device in, e.g., a smartphone form. In this case, an antenna may be combined with the display device to provide a communication function.

As mobile communication technologies have been rapidly developed, an antenna capable of operating a high frequency or ultra-high frequency communication is needed in the display device. Further, as the display device equipped with the antenna becomes thinner and light-weighted, a space for the antenna may be also decreased. Accordingly, the antenna that may be inserted into the display device and may have a reduced dimension may be needed.

As the antenna is combined with the display device, radiation and impedance properties of the antenna may be disturbed by structures included in the display device. For example, the radiation properties of the antenna which may be set to a desired frequency and impedance may be changed by dielectric structures stacked on the antenna, and a gain of the antenna may also be decreased.

Additionally, when a plurality of dielectric layers or insulating layers are stacked on the antenna, disturbance and mismatch of the radiation properties may be more easily caused.

Thus, an antenna design capable of being free from an influence of structures of the display device and providing a radiation in a desired high frequency band is needed. For example, Korean Patent Application Publication No. 10-2013-0095451 discloses an antenna integrated with a display panel, but the compatibility with the display device as described above is not sufficiently considered.

SUMMARY

According to an aspect of the present invention, there is provided an antenna stack structure having improved signaling efficiency and radiation property.

According to an aspect of the present invention, there is provided a display device including an antenna stack structure with improved signaling efficiency and radiation property.

(1) An antenna stack structure, including: a lower dielectric layer; an antenna electrode layer formed on the lower dielectric layer; and an upper dielectric layer disposed on the antenna electrode layer, wherein a dielectric constant of the upper dielectric layer is 1 or more and less than 7, and a thickness of the upper dielectric layer is in a range from 100 pin to 1,300 μm.

(2) The antenna stack structure according to the above (1), wherein the dielectric constant of the upper dielectric layer is from 1 to 5.5.

(3) The antenna stack structure according to the above (1), wherein the upper dielectric layer includes a glass, a resin layer or an adhesive layer.

(4) The antenna stack structure according to the above (1), wherein the upper dielectric layer includes a plurality of dielectric layers.

(5) The antenna stack structure according to the above (4), wherein the plurality of dielectric layers are stacked so that dielectric constants are sequentially increased from the antenna electrode layer.

(6) The antenna stack structure according to the above (4), wherein the upper dielectric layer includes a first upper dielectric layer and a second upper dielectric layer sequentially stacked from the antenna electrode layer, and the first upper dielectric layer and the second upper dielectric layer have different dielectric constants from each other.

(7) The antenna stack structure according to the above (6), wherein a dielectric constant of the first upper dielectric layer is smaller than a dielectric constant of the second upper dielectric layer.

(8) The antenna stack structure according to the above (1), further including a ground layer disposed under the lower dielectric layer to face the antenna electrode layer.

(9) The antenna stack structure according to the above (8), further including a substrate layer disposed between the ground layer and the lower dielectric layer.

(10) The antenna stack structure according to the above (9), further comprising an adhesive layer disposed between the substrate layer and the ground layer.

(11) The antenna stack structure according to the above (1), wherein the antenna electrode layer includes a radiator, a transmission line extending from the radiator and a signal pad connected to one end of the transmission line.

(12) The antenna stack structure according to the above (11), wherein the radiator includes a mesh structure, and the antenna electrode layer further includes a dummy mesh pattern formed around the radiator.

(13) The antenna stack structure according to the above (12), wherein the signal pad has a solid pattern structure.

(14) A display device, including: a display panel; and the antenna stack structure according to embodiments as described above stacked on the display panel.

(15) The display device according to the above (14), further including a touch sensor layer interposed between the display panel and the antenna stack structure.

The antenna stack according to embodiments of the present invention may include an upper dielectric layer formed on an antenna electrode layer and having a dielectric constant and a thickness range within predetermined ranges. The dielectric constant/thickness of the upper dielectric layer may be controlled so that sufficient antenna gain properties may be achieved while maintaining high frequency or ultra-high frequency radiation properties from the antenna electrode layer.

In some embodiments, the upper dielectric layer may have a multi-layered structure. A first upper dielectric layer adjacent to the antenna electrode layer may have a dielectric constant less than that of a second upper dielectric layer relatively spaced apart from the antenna electrode layer. Accordingly, a signal loss of the antenna may be more effectively prevented while suppressing an excessive frequency shift.

DETAILED DESCRIPTION OF THE EMBODIMENTS

According to exemplary embodiments of the present invention, there is provided an antenna stack structure including a lower dielectric layer, an antenna electrode layer and an upper dielectric layer.

The antenna electrode layer included in the antenna stack structure may be, e.g., a microstrip patch antenna fabricated in the form of a transparent film. The antenna stack structure may be applied to communication devices for a mobile communication of a high or ultrahigh frequency band corresponding to a mobile communication of, e.g., 3G, 4G, 5G or more to provide an improved signaling efficiency.

According to exemplary embodiments of the present invention, there is also provided a display device including the antenna stack structure. An application of the antenna stack structure is not limited to the display device, and the antenna device may be applied to various objects or structures such as a vehicle, a home electronic appliance, an architecture, etc.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
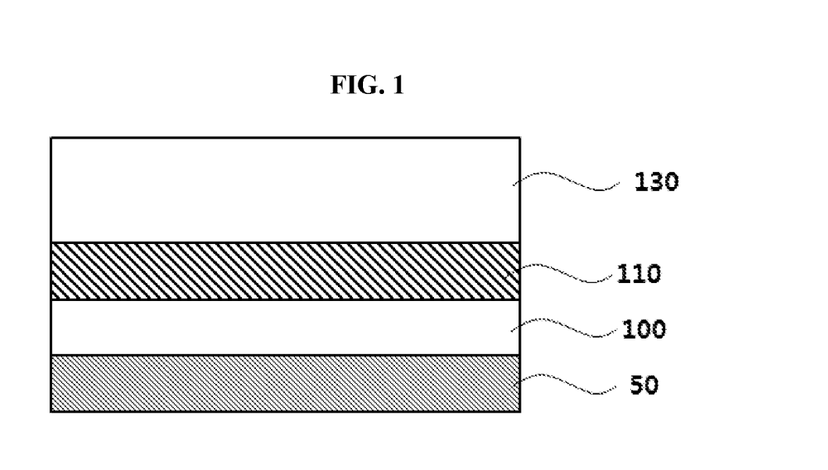
FIG. 1 is a schematic cross-sectional view illustrating an antenna stack structure in accordance with exemplary embodiments.

FIG. 1 is a schematic cross-sectional view illustrating an antenna stack structure in accordance with exemplary embodiments.

Referring to FIG. 1, the antenna stack structure may include a lower dielectric layer 100, an antenna electrode layer 110 and an upper dielectric layer 130. In some embodiments, a ground layer 50 may be disposed under the lower dielectric layer 100.

The lower dielectric layer 100 may serve as a base dielectric layer of the antenna stack structure or a substrate layer for forming the antenna electrode layer 110.

For example, capacitance or inductance may be formed between the antenna electrode layer 110 and the ground layer 50 by the lower dielectric layer 100, so that a frequency band at which the antenna stack structure may be driven or operated may be adjusted.

In exemplary embodiments, a dielectric constant of the lower dielectric layer 100 may be adjusted in a range from about 1.5 to about 12. If the dielectric constant exceeds about 12, a driving frequency may be excessively reduced and the driving in a desired high frequency band may not be implemented. Preferably, the dielectric constant of the lower dielectric layer 100 may be adjusted in a range from about 2 to about 10.

The lower dielectric layer 100 may include an insulating material having a dielectric constant in the above-described range. The lower dielectric layer 100 may include, e.g., an inorganic insulating material such as glass, silicon oxide, silicon nitride, or a metal oxide, or an organic insulating material such as an epoxy resin, an acrylic resin, or an imide-based resin.

The lower dielectric layer 100 may include, e.g., a transparent resin film. For example, the dielectric layer 100 may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more thereof.

For example, a thickness of the lower dielectric layer 100 may be adjusted in a range from about 50 μm to about 1,000 μm. Within the above range, a high-frequency driving of the antenna stack structure may be easily obtained while suppressing excessive signal loss.

The antenna electrode layer 110 may be formed on a top surface of the lower dielectric layer 100.

In exemplary embodiments, the antenna electrode layer 110 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in a combination thereof.

In an embodiment, the antenna electrode layer 110 may include may include silver (Ag) or a silver alloy (e.g., silver-palladium-copper (APC)), or copper (Cu) or a copper alloy (e.g., a copper-calcium (CuCa)) to implement a low resistance and a fine line width pattern.

In some embodiments, the antenna electrode layer 110 may include a transparent conductive oxide such indium tin oxide (ITO), indium zinc oxide (IZO), zinc oxide (ZnOx), indium zinc tin oxide (IZTO), tin oxide (SnOx), etc.

For example, the antenna electrode layer 110 may include a multi-layered structure of a transparent conductive oxide layer and a metal layer. For example, the antenna electrode layer 110 may include a double-layered structure of a transparent conductive oxide layer-metal layer, or a triple-layered structure of a transparent conductive oxide layer-metal layer-transparent conductive oxide layer.

The antenna electrode layer 110 may include an antenna unit including a radiator, a transmission line, and a signal pad. Structures and elements of the antenna electrode layer 110 will be described later in more detail with reference to FIG. 2.

The ground layer 50 may be disposed on a bottom surface of the lower dielectric layer 100. In exemplary embodiments, a vertical radiation in a thickness direction of the antenna stack structure may be induced from the radiator of the antenna electrode layer 110 through the ground layer 50. The ground layer 50 may serve as a noise absorbing or shielding electrode of the antenna stack structure. The ground layer 50 may include the above-described metal or alloy.

The upper dielectric layer 130 may be formed on the antenna electrode layer 110. For example, the upper dielectric layer 130 may be formed on the lower dielectric layer 100 to cover the antenna electrode layer 110.

The upper dielectric layer 130 may serve as, e.g., a protective layer of the antenna electrode layer 110, and may function as a fine control layer of a resonance frequency implemented from the antenna electrode layer 110.

For example, a main resonance frequency through the antenna stack structure may be set by the lower dielectric layer 100. Thereafter, a frequency may be finely shifted within a predetermined range (e.g., 23 GHz or more, or 23 to 35 GHz) according to a desired resonance frequency by adjusting a thickness and a dielectric constant of the upper dielectric layer 130.

In exemplary embodiments, the thickness of the upper dielectric layer 130 may be from about 100 μm to about 1,300 μm. The dielectric constant of the upper dielectric layer 130 may be adjusted to be 1 or more and less than 7.

Within the above ranges of the thickness and the dielectric constant, a fine adjustment of the frequency or bandwidth may be implemented while preventing an excessive shift of the resonance frequency. Additionally, an excessive gain reduction of the antenna stack structure by the upper dielectric layer 130 may also be prevented.

For example, when the thickness of the upper dielectric layer 130 exceeds about 1,300 μm or the dielectric constant of the upper dielectric layer 130 is 7 or more, a gain amount of the antenna stack structure may be excessively reduced (e.g., less than −0.1 dBi).

The thickness of the upper dielectric layer 130 may be set as 100 μm or more, and the dielectric constant of the upper dielectric layer 130 may be set as 1 or more in consideration of process convenience and protection of the antenna electrode layer 110.

In a preferable embodiment, the dielectric constant of the upper dielectric layer 130 may be adjusted in a range from about 1 to about 6.5, more preferably from about 1 to about 5.5.

The upper dielectric layer 130 may be formed using an insulating material substantially the same as or similar to those described above in the lower dielectric layer 100. For example, the upper dielectric layer 130 may include glass, an inorganic insulating material or a resin material.

In an embodiment, the upper dielectric layer 130 may include an adhesive layer such as an OCA (optically clear adhesive) layer or a PSA (pressure sensitive adhesive) layer.

Figure 2:
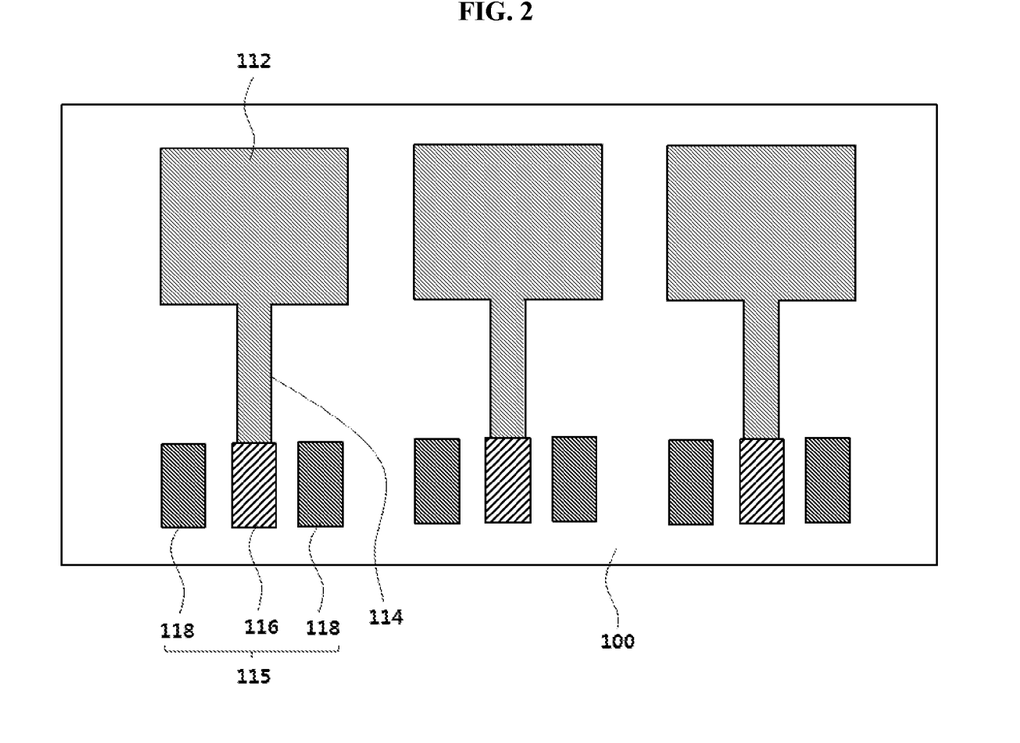
FIG. 2 is a schematic top planar view illustrating a construction of an antenna unit included in an antenna electrode layer in accordance with exemplary embodiments.

FIG. 2 is a schematic top planar view illustrating a construction of an antenna unit included in an antenna electrode layer in accordance with exemplary embodiments.

Referring to FIG. 2, the antenna electrode layer 110 may include an antenna unit disposed on the lower dielectric layer 100. For example, a plurality of the antenna units may be arranged on the lower dielectric layer 100 in an array form.

Each antenna unit may include a radiator 112, a transmission line 114 and a pad 115.

The radiator 112 may have, e.g., a polygonal plate shape, and the transmission line 114 may extend from one side of the radiator 112 to be electrically connected to a signal pad 116. The transmission line 114 may be formed as a single member substantially integral with the radiator 112.

In some embodiments, the pad 115 includes the signal pad 116, and may further include a ground pad 118. For example, a pair of the ground pads 118 may be disposed with the signal pad 116 interposed therebetween. The ground pads 118 may be electrically separated from the signal pad 116 and the transmission line 114.

In an embodiment, the ground pad 118 may be omitted. Further, the signal pad 116 may be provided as an integral member at an end portion of the transmission line 114.

The pad 115 may be electrically connected to an antenna driving integrated circuit (IC) chip via a conductive intermediate circuit structure such as a flexible printed circuit board. Accordingly, a feeding and a driving control to the antenna unit may be performed through the antenna driving IC chip.

In an embodiment, the antenna driving IC chip may be directly mounted on a surface of the flexible printed circuit board. In an embodiment, the antenna driving IC chip may be mounted on a rigid printed circuit board, and the rigid printed circuit board may be combined with the flexible printed circuit board.

Figure 3:
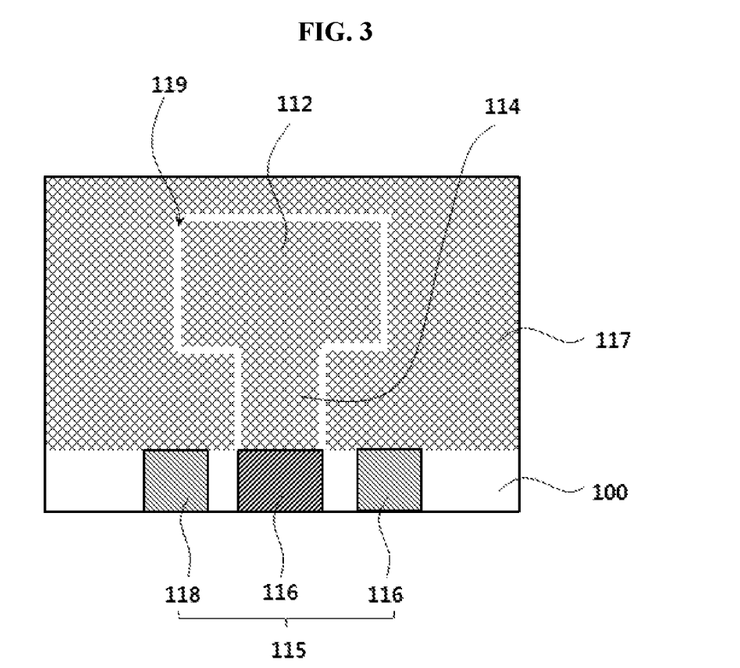
FIG. 3 is a schematic top planar view illustrating a construction of an antenna unit included in an antenna electrode layer in accordance with some exemplary embodiments.

FIG. 3 is a schematic top planar view illustrating a construction of an antenna unit included in an antenna electrode layer in accordance with exemplary embodiments.

Referring to FIG. 3, the radiator 112 may have a mesh structure. In some embodiments, the transmission line 114 connected to the radiator 112 may also have a mesh structure.

The radiator 112 may include the mesh structure, so that transmittance may be improved even when the radiator 112 is disposed in a display area of a display device, thereby preventing electrodes from being visually recognized and an image quality from being deteriorated.

A dummy mesh pattern 117 may be disposed around the radiator 112 and the transmission line 114. The dummy mesh pattern 117 may be electrically and physically separated from the radiator 112 and the transmission line 114 by a separation region 119.

For example, as described above, a conductive layer may be formed on the lower dielectric layer 100. Thereafter, while forming the mesh structure by etching the conductive layer, the conductive layer may be partially etched along a profile of the radiator 112 and the transmission line 114 to form the separation region 119. Accordingly, a portion of the conductive layer may be converted into the dummy mesh pattern 117.

In some embodiments, the pad 115 may be formed as a solid structure to reduce a feeding resistance. For example, the pad 115 may be disposed in a non-display area or a light-shielding area of a display device to be bonded or connected to a flexible circuit board and/or an antenna driving IC chip. Accordingly, the pad 115 may be disposed at an outside of a user's viewing area.

Figure 4:
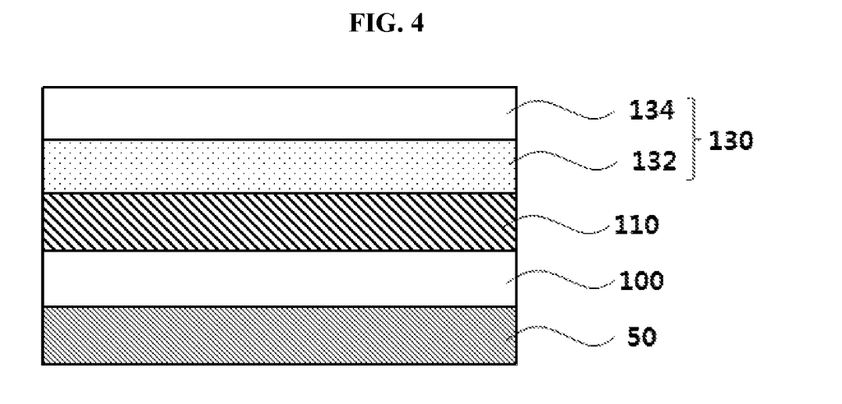
FIGS. 4 to 6 are schematic cross-sectional views illustrating antenna stack structures in accordance with some exemplary embodiments.
Figure 5:
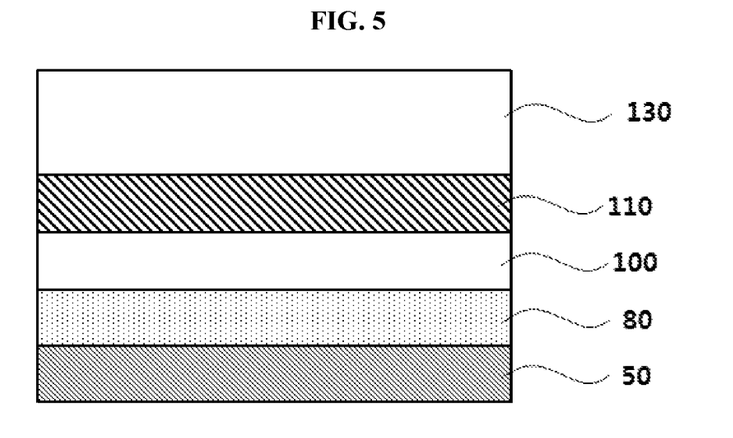
Figure 6:
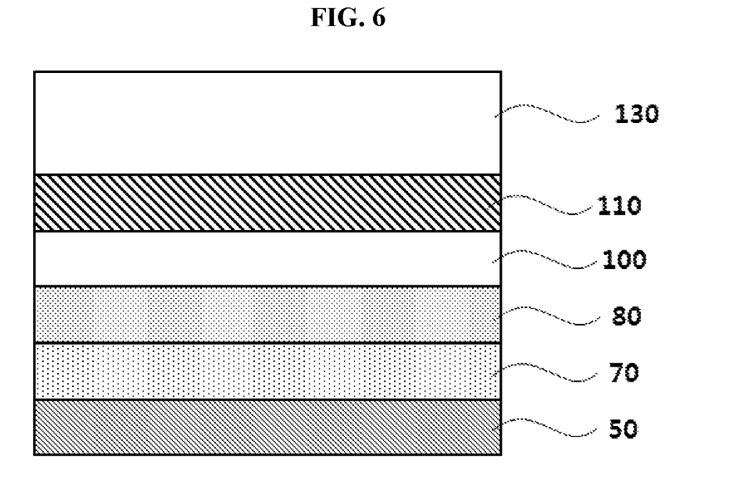

FIGS. 4 to 6 are schematic cross-sectional views illustrating antenna stack structures in accordance with some exemplary embodiments.

Referring to FIG. 4, the upper dielectric layer 130 may have a multi-layered structure. For example, the upper dielectric layer 130 may include a first upper dielectric layer 132 and a second upper dielectric layer 134.

The first upper dielectric layer 132 and the second upper dielectric layer 134 may be sequentially stacked from the antenna electrode layer 110. For example, the first upper dielectric layer 132 may be in a direct contact with the antenna electrode layer 110, and the second upper dielectric layer 134 may be formed on the first upper dielectric layer 132 to be spaced apart from the antenna electrode layer 110 in a thickness direction.

The first upper dielectric layer 132 and the second upper dielectric layer 134 may have different dielectric constants. In exemplary embodiments, the dielectric constant of the first upper dielectric layer 132 may be lower than that of the second upper dielectric layer 134.

The dielectric constant of the first upper dielectric layer 132 adjacent to the antenna electrode layer 110 may be adjusted to be relatively low, so that a direct influence on, e.g., radiation and gain properties of the radiator 112 may be avoided or suppressed. The second upper dielectric layer 134 may have an increased dielectric constant compared to that of the first upper dielectric layer 132, and may serve as a layer for the above-described fine frequency or bandwidth adjustment.

As described above, the upper dielectric layer 130 having the multi-layered structure may be utilized so that a drastic change of a resonance and radiation environment over the antenna electrode layer 110 may be suppressed, and a frequency/bandwidth may be gradually adjusted while suppressing a gain reduction of the radiator 112.

For example, the dielectric constant of the first upper dielectric layer 132 may be 1 or more and less than 5, and the dielectric constant of the second upper dielectric layer 134 may be 5 or more and less than 7. A total thickness of the upper dielectric layer 130 including the first and second upper dielectric layers 132 and 134 may be from about 100 μm to 1,300 μm as described above.

In some embodiments, the upper dielectric layer 130 may include a multi-layered structure having three or more dielectric layers. In this case, the dielectric layers may be stacked so that a dielectric constant may be sequentially increased from the antenna electrode layer 110.

Referring to FIG. 5, a substrate layer 80 may be further included between the lower dielectric layer 100 and the ground layer 50.

The substrate layer 80 may include, e.g., a cyclic olefin polymer (COP), polyethylene terephthalate (PET), polyacrylate (PAR), polyetherimide (PEI), polyethylene naphthalate (PEN), polyphenylene sulfide (PPS), polyallylate, polyimide (PI), cellulose acetate propionate (CAP), polyethersulfone (PES), cellulose triacetate (TAC), polycarbonate (PC), cyclic olefin copolymer (COC), polymethyl methacrylate (PMMA), or the like. The substrate layer 80 may serve as a flexible lower substrate of the antenna stack structure. Preferably, the substrate layer 80 may include COP.

Referring to FIG. 6, an adhesive layer 70 may be further included between the substrate layer 80 and the ground layer 50 described with reference to FIG. 5.

For example, electrodes or wirings included in a touch panel or a display device to which the antenna stack structure is employed may be used as the ground layer 50 of the antenna stack structure. In this case, the antenna stack structure may be attached on the touch panel or the display device via the adhesive layer 70.

In an embodiment, a metallic member such as a SUS plate, a sensor member such as a digitizer, a heat dissipation sheet, etc., disposed at a rear portion of the display device may serve as the ground layer 50.

The adhesive layer 70 and the substrate layer 80 may serve as a base dielectric layer of the antenna stack structure together with the lower dielectric layer 100. In some embodiments, a plurality of the substrate layers 80 and the adhesive layers 70 may be repeatedly included for an impedance matching.

Figure 7:
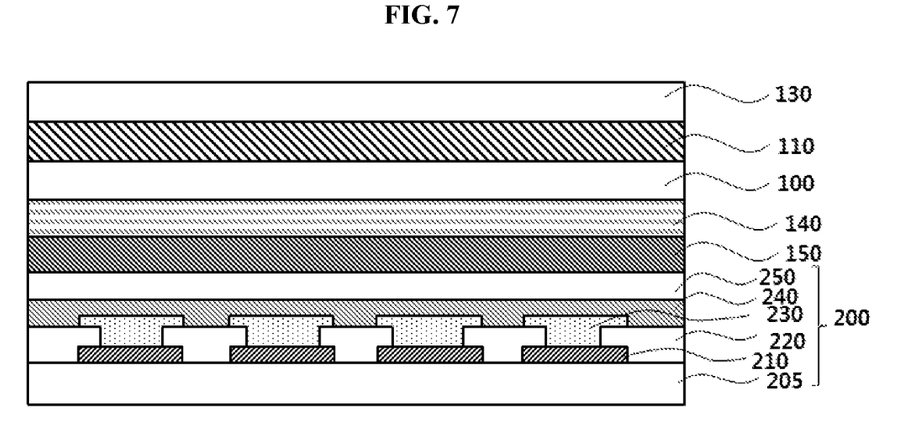
FIG. 7 is a schematic cross-sectional view illustrating a display device in accordance with exemplary embodiments.

FIG. 7 is a schematic cross-sectional view illustrating a display device in accordance with exemplary embodiments.

Referring to FIG. 7, as described above, the antenna stack structure including the lower dielectric layer 100, the antenna electrode layer 110 and the upper dielectric layer 130 may be stacked on the display panel 200. Accordingly, a display device to which the antenna stack structure is applied may be provided.

The display panel 200 may include a pixel electrode 210, a pixel defining layer 220, a display layer 230, an opposing electrode 240 and an encapsulation layer 250 disposed on a panel substrate 205.

A pixel circuit including a thin film transistor (TFT) may be formed on the panel substrate 205, and an insulation layer covering the pixel circuit may be formed. The pixel electrode 210 may be electrically connected to, e.g., a drain electrode of the TFT on the insulation layer.

The pixel defining layer 220 may be formed on the insulation layer, and the pixel electrode 210 may be exposed through the pixel defining layer 220 such that a pixel region may be defined. The display layer 230 may be formed on the pixel electrode 210, and the display layer 230 may include, e.g., a liquid crystal layer or an organic light emitting layer.

The opposing electrode 240 may be disposed on the pixel defining layer 220 and the display layer 230. The opposing electrode 240 may serve as, e.g., a common electrode or a cathode of the display device. The encapsulation layer 250 may be disposed on the opposing electrode 240 to protect the display panel 200.

In some embodiments, a touch sensor layer 150 may be stacked on the display panel 200. The touch sensor layer 150 may include, e.g., capacitive sensing electrodes. For example, column direction sensing electrodes and row direction sensing electrodes may be arranged to cross each other.

For example, the pixel electrode 210 or the opposing electrode 240 included in the display panel 200 may serve as a ground layer of the antenna stack structure. Further, the sensing electrodes included in the touch sensor layer 150 may serve as the ground layer.

In some embodiments, a polarization layer 140 may be disposed between the antenna stack structure and the touch sensor layer 150.

The polarizing layer 140 may include a coating-type polarizer or a polarizing plate. The coating-type polarizer may include a liquid crystal coating layer including a polymerizable liquid crystal compound and a dichroic dye. In this case, the polarizing layer 140 may further include an alignment layer for providing the liquid crystal coating layer with an orientation.

For example, the polarizing plate may include a polyvinyl alcohol-based polarizer and a protective film attached to at least one surface of the polyvinyl alcohol-based polarizer.

As illustrated in FIG. 7, if the polarizing layer 140 is disposed under the antenna stack structure, the polarizing layer 140 may serve as a base dielectric layer for the antenna electrode layer 110 together with the lower dielectric layer 100.

In some embodiments, the polarizing layer 140 may be disposed on the antenna stack structure. In this case, the polarizing layer 140 may be provided as a dielectric layer included in the upper dielectric layer 130.

Hereinafter, preferred embodiments are proposed to more concretely describe the present invention. However, the following examples are only given for illustrating the present invention and those skilled in the related art will obviously understand that these examples do not restrict the appended claims but various alterations and modifications are possible within the scope and spirit of the present invention. Such alterations and modifications are duly included in the appended claims.

Experimental Example 1: Evaluation on an Antenna Gain According to a Thickness of an Upper Dielectric Layer An antenna electrode layer formed of CuCa with a thickness of 2,400 Å was formed on a COP dielectric layer, and an upper dielectric layer was laminated on the antenna electrode layer using a glass having a dielectric constant of 5.5.

After supplying a power to the antenna electrode layer while changing the thickness of the upper dielectric layer, an antenna gain was measured using an Ansys High Frequency Structure Simulator (HFSS). Specifically, as shown in Table 1 below, thicknesses of 20 samples were sequentially increased from 100 μm to 2,000 μm, and then an antenna gain change was measured.

The antenna gain is defined by Equation 1 below.

$$\text{Antenna Gain}\,(G)(dBi) = \frac{4\pi U}{P_{in}} \quad \text{[Equation 1]}$$

(Pin: input power (W), U: radiation intensity (W/unit solid angle))

The results are shown in Table 1 below.

TABLE 1

| Sample No. | Upper Dielectric Layer Thickness (μm) | Antenna Gain (dBi) |
|---|---|---|
| 1-1 | 100 | 0.0946 |
| 1-2 | 200 | −0.0216 |
| 1-3 | 300 | 0.1405 |
| 1-4 | 400 | 0.1362 |
| 1-5 | 500 | 0.4016 |
| 1-6 | 600 | 0.2933 |
| 1-7 | 700 | 0.8230 |
| 1-8 | 800 | 1.2504 |
| 1-9 | 900 | 1.3219 |
| 1-10 | 1000 | 1.3194 |
| 1-11 | 1100 | 1.3876 |
| 1-12 | 1200 | 1.0487 |
| 1-13 | 1300 | 0.5768 |
| 1-14 | 1400 | −0.2057 |
| 1-15 | 1500 | −0.3882 |
| 1-16 | 1600 | −0.9545 |
| 1-17 | 1700 | −1.4194 |
| 1-18 | 1800 | −2.0743 |
| 1-19 | 1900 | −2.5315 |
| 1-20 | 2000 | −2.7927 |

TABLE 1-continued

Referring to Table 1, as the thickness of the upper dielectric layer exceeded 1,300 μm, the antenna gain was reduced to less than −0.1 dBi, and a stable antenna gain was maintained in the thickness range of 1,300 μm or less.

Experimental Example 2: Evaluation on a Frequency Shift and a Gain According to a Change of a Dielectric Constant An antenna electrode layer formed of CuCa with a thickness of 2,400 Å was formed on a COP dielectric layer, and an upper dielectric layer having a thickness of 1,100 μm was laminated. Changes of a frequency and a gain according to a change of a dielectric constant (between 1 and 9) were simulated.

Specifically, S-parameters (S11) according to frequencies were plotted using Network Analyzer, and a frequency at which a resonance peak was observed was measured to evaluate the frequency shift.

The results are shown in Table 2 below.

| Sample No. | Dielectric Constant | Frequency (GHz) | Antenna Gain (dBi) |
|---|---|---|---|
| 2-1 | 1.0 | 30.60 | 0.6927 |
| 2-2 | 1.5 | 29.95 | 0.8648 |
| 2-3 | 2 | 29.25 | 1.2233 |
| 2-4 | 2.5 | 28.60 | 1.4746 |
| 2-5 | 3 | 27.80 | 1.5847 |
| 2-6 | 3.5 | 27.25 | 1.7141 |
| 2-7 | 4.0 | 26.55 | 1.7407 |
| 2-8 | 4.5 | 26.00 | 1.6939 |
| 2-9 | 5.0 | 25.00 | 1.4494 |
| 2-10 | 5.5 | 24.65 | 1.3876 |
| 2-11 | 6.0 | 23.85 | 0.9717 |
| 2-12 | 6.5 | 23.25 | 0.6508 |
| 2-13 | 7.0 | 22.50 | 0.1428 |
| 2-14 | 7.5 | 22.50 | 0.2087 |
| 2-15 | 8.0 | 22.05 | −0.2282 |
| 2-16 | 8.5 | 21.55 | −0.5514 |
| 2-17 | 9.0 | 21.15 | −0.8885 |

Referring to Table 2, as the dielectric constant of the upper dielectric layer exceeded 6.5, a radiation property in a practical high-frequency range (23 GHz or more) was not achieved. Further, when the dielectric constant was 5.5 or less, a frequency of 24 GHz or more was implemented. As the dielectric constant became 7 or more, a drastic decrease of the antenna gain occurred.

Experimental Example 3: Evaluation on a Frequency Shift and a Gain According to a Stacked Construction of an Upper Dielectric Layer An antenna electrode layer formed of CuCa with a thickness of 2,400 Å was formed on a COP dielectric layer. While changing a stack construction of an upper dielectric layer as listed in Table 3 below, changes of a frequency and an antenna gain were measured as stated in Experimental Example 2 with a target frequency set as 27.5 GHz.

TABLE 3

| Sample No. | Construction of Upper Dielectric Layer | Frequency (GHz) | Antenna Gain (dBi) |
|---|---|---|---|
| 3-1 | dielectric constant: 3.2 thickness 1,000 μm, single layer | 27.5 | 1.8 |
| 3-2 | dielectric constant: 5.5 thickness 1,000 μm, single layer | 23.7 | 1.0 |
| 3-3 | First Upper Dielectric Layer dielectric constant: 3.0, thickness: 500 μm Second Upper Dielectric Layer dielectric constant: 5.5, thickness: 500 μm | 27.5 | 2.1 |
| 3-4 | First Upper Dielectric Layer dielectric constant: 5.5, thickness: 500 μm Second Upper Dielectric Layer dielectric constant: 3.0, thickness: 500 μm | 25.3 | 1.4 |

Referring to Table 3, it can be predicted that when the stacked construction of the upper dielectric layers having different dielectric constants is used, a desired high-frequency communication can be more effectively implemented while suppressing antenna gain loss/excessive frequency shift.

As shown in Sample 3-3, when the dielectric constant of the first upper dielectric layer was adjusted to be lower than that of the second upper dielectric layer, the frequency shift suppression/gain increase was more effectively implemented.

What is claimed is:

1. An antenna stack structure, comprising:
   a lower dielectric layer;
   an antenna electrode layer formed on the lower dielectric layer; and
   an upper dielectric layer disposed on the antenna electrode layer,
   wherein a dielectric constant of the upper dielectric layer is 1 or more and less than 7, and a thickness of the upper dielectric layer is in a range from 100 μm to 1,300 μm,
   wherein the upper dielectric layer comprises a first upper dielectric layer and a second upper dielectric layer sequentially stacked from the antenna electrode layer, and
   the first upper dielectric layer and the second upper dielectric layer have different dielectric constants from each other.

2. The antenna stack structure according to claim 1, wherein the dielectric constant of the upper dielectric layer is from 1 to 5.5.

3. The antenna stack structure according to claim 1, wherein the upper dielectric layer includes a glass, a resin layer or an adhesive layer.

4. The antenna stack structure according to claim 1, wherein the plurality of dielectric layers are stacked so that dielectric constants are sequentially increased from the antenna electrode layer.

5. The antenna stack structure according to claim 1, wherein a dielectric constant of the first upper dielectric layer is smaller than a dielectric constant of the second upper dielectric layer.

6. The antenna stack structure according to claim 1, further comprising a ground layer disposed under the lower dielectric layer to face the antenna electrode layer.

7. The antenna stack structure according to claim 6, further comprising a substrate layer disposed between the ground layer and the lower dielectric layer.

8. The antenna stack structure according to claim 7, further comprising an adhesive layer disposed between the substrate layer and the ground layer.

9. The antenna stack structure according to claim 1, wherein the antenna electrode layer comprises a radiator, a transmission line extending from the radiator and a signal pad connected to one end of the transmission line.

10. The antenna stack structure according to claim 9, wherein the radiator includes a mesh structure, and the antenna electrode layer further comprises a dummy mesh pattern formed around the radiator.

11. The antenna stack structure according to claim 10, wherein the signal pad has a solid pattern structure.

12. A display device, comprising:
    a display panel; and
    the antenna stack structure according to claim 1 stacked on the display panel.

13. The display device according to claim 12, further comprising a touch sensor layer interposed between the display panel and the antenna stack structure.

* * * * *